(12) United States Patent
Kiessling (10) Patent No.: US 6,691,689 B2
(45) Date of Patent: Feb. 17, 2004

(54) ROTATION DIRECTION DETECTOR IN IGNITION EQUIPMENT OF AN INTERNAL COMBUSTION ENGINE

(75) Inventor: Leo Kiessling, Cadolzburg (DE)

(73) Assignee: Prüfrex-Elektro-Apparatebau, Inh. Helga Müller. Geb Dutschke, Cadolzburg (DE)

( * ) Notice: Subject to any disclaimer, the term of this patent is extended or adjusted under 35 U.S.C. 154(b) by 265 days.

(21) Appl. No.: 09/976,072

(22) Filed: Oct. 12, 2001

(65) Prior Publication Data

US 2002/0078937 A1 Jun. 27, 2002

(30) Foreign Application Priority Data

Oct. 13, 2000 (DE) .......................... 100 50 930
Feb. 13, 2001 (DE) .......................... 101 07 070

(51) Int. Cl.[7] ................................ F02P 7/067
(52) U.S. Cl. ................... 123/603; 123/406.56
(58) Field of Search ............... 123/406.56, 406.57, 123/406.63, 599, 600, 603, 605, 149 D, 149 F; 310/153, 156.01

(56) References Cited

U.S. PATENT DOCUMENTS

| 3,722,488 | A | | 3/1973 | Swift et al. |
|---|---|---|---|---|
| 3,809,040 | A | | 5/1974 | Burson et al. |
| 4,074,669 | A | | 2/1978 | Cavil et al. |
| 4,401,096 | A | * | 8/1983 | Podrapsky .................. 123/631 |
| 4,722,311 | A | * | 2/1988 | Erhard .................. 123/406.57 |
| 5,050,553 | A | | 9/1991 | Erhard |
| 5,606,958 | A | | 3/1997 | Chrintz-Gath et al. |
| 6,474,273 | B1 | * | 11/2002 | Kinoshita et al. ......... 123/41 E |
| 2003/0089336 | A1 | * | 5/2003 | Kiessling ............... 123/406.57 |

FOREIGN PATENT DOCUMENTS

| DE | 36 08 740 A1 | 10/1987 |
|---|---|---|
| DE | 37 06 725 A1 | 9/1988 |
| IT | A 1235393 | 6/1992 |

* cited by examiner

*Primary Examiner*—Mahmoud Gimie
*Assistant Examiner*—Hai Huynh
(74) *Attorney, Agent, or Firm*—Frank H. Foster; Kremblas, Foster, Phillips & Pollick (57) ABSTRACT

Apparatus and method for detecting the direction of rotation of an internal combustion engine using a magnet wheel which moves past an electrical ignition coil. For each revolution, at least one current or voltage pulse is induced in the coil having a polarity dependent on the direction of rotation. The magnet poles and the coil have geometric relationships that, upon each magnet wheel revolution, the curve form of the current or voltage pulse has at least two prespecified extreme points with a curve characteristic which is substantially neither rising nor falling and at least one break point with a discontinuity. A direction of rotation signal is derived from these curve characteristics.

27 Claims, 5 Drawing Sheets

Forwards

ROTATION DIRECTION DETECTOR IN IGNITION EQUIPMENT OF AN INTERNAL COMBUSTION ENGINE

BACKGROUND OF THE INVENTION

1. Field of the Invention

The invention concerns a method for recognition of direction of rotation for the ignition system of an internal combustion engine using a magnet wheel which can be moved past an electrical ignition coil arrangement by the internal combustion engine. As a result, there is induced in the coil arrangement, for each revolution, at least one current pulse or voltage pulse whose polarity is dependent on the direction of rotation. The invention further concerns an ignition module with (electronic) evaluation means for recognition of direction of rotation according to the aforementioned method. In this case, the evaluation means perform sampling, evaluation and/or processing of current pulses or voltage pulses which have been induced by interaction with the rotating magnet wheel. The invention further concerns a direction of rotation detector, suitable for use in the said method or ignition module, whose input can be coupled to an alternating voltage source, in particular, to an ignition coil arrangement excited by a magnetic alternating field, for the purpose of sampling, evaluating and/of filtering current half-waves or voltage half-waves generated therein.

2. Description of the Related Art

Ignition systems with recognition of direction of rotation are used in hand-controlled working equipment with an internal combustion engine in which no ignition sparks are to be generated when the engine is running backwards. This is because, on starting, such internal combustion engines have a tendency to "oscillate" contrary to the direction of rotation, due to high compression pressures. In order that the engine does not start in the backward direction, however, an objective to be sought is that the ignition module does not emit any ignition sparks upon backward rotation (cf. U.S. Pat. No. 5,606,958).

Known in the art (cf. U.S. Pat. No. 5,050,553) is the practice of evaluating by means of control electronics the sequence of voltage half-waves induced in each revolution of the internal combustion engine, or the magnet wheel driven by it. These control electronics operate with displacement curves for the starting ignition and the operating ignition. These two curves overlap one another over a rotational speed range which has the idling rotational speed as the upper limit. The control requirement for interrogating and differentiating these two curves is considerable. In order to permit reliable recognition, it is necessary to take into account a large angular range, which reduces the reaction time and dynamic response.

A known ignition system for an internal combustion engine (U.S. Pat. No. 5,606,958) is provided with an additional winding on a separate I-shaped iron core. During the normal rotation of the magnet wheel, this additional winding is first passed by the magnet poles before the poles move past two limbs of a further, subsequent magnetic iron core. The voltage induced in the additional winding is used to suppress trigger pulses in respect of a switching device when the engine is rotating backwards. A disadvantage is that a separate core is required for the additional winding and, as a consequence, additional construction space. Moreover, the additional winding must be contacted with the electronics printed circuit board.

Known from DE-A-37 06 725 is an ignition device with permanent magnets, guided past iron core limbs, with two pole shoe magnets. In order to increase the security against backward rotation, the pole shoe packet following in the operating direction of rotation is designed to be of such a length that, in running past, it magnetically short-circuits the iron core limbs of the ignition coils. This, however, results in an asymmetrical design of the pole shoes of the magnet wheel. The increased production and material requirement which results is obvious.

A generic capacitor ignition system is known from DE-A-36 08 740. In order to protect the internal combustion engine operated by it against running backwards, a direction of rotation detector is provided which is intended to prevent the discharge of ignition pulses in the event of an incorrect direction of rotation of the engine. To realize this, electronics are proposed for ascertaining the number of positive and negative half-waves induced in a magnet generator. This is because, in the case of the usual construction of generic magnet generators with a U-shaped iron core and coils disposed on at least one of the limbs of this core, depending on the direction of rotation of the magnet wheel provided with the permanent magnets, there is produced in the coil an induced voltage which consists either of two negative half-waves and one positive half-wave, or of two positive half-waves and one negative half-wave. The electronics can thus ascertain the number of positive and/or negative half-waves and, consequently, the direction of rotation of the magnet wheel. In this case, however, there is a need for pulse counting together with preceding rectification over a relatively large angular range, resulting in an increased counting time and a reduced dynamic response. The information, or indication, of the direction of rotation is only available at the end of a period with the half-wave sequence.

BRIEF SUMMARY OF THE INVENTION

The object of the invention is to create a direction of rotation recognition system, suitable for an internal combustion ignition system, which renders possible ascertainment of the direction of rotation with a minimal angular range with a greater speed and dynamic response and a reduced circuitry and/or programming requirement. In particular, the result of the recognition of the direction of rotation is to be fixed in respect of angle, i.e., always available in the same rotational position of the magnet wheel.

Proposed to achieve the object are the method disclosed in claim 1, the ignition module disclosed in claim 7 and the direction of rotation detector disclosed in claim 18. Advantageous developments are given by the dependent claims.

Within the scope of the general inventive concept, a voltage signal point which is indicative of the direction of rotation of the magnet wheel is used in the voltage signal of a coil disposed on an expediently U- or E-shaped iron core. For this purpose, the voltage signal is shaped or modified in such a way that it contains a feature which is indicative of the direction of rotation. According to the invention, therefore, a method and electronics for its implementation are developed which provide the information on the direction of rotation in the form of an indicating signal. This can be suitable for controlling the trigger electronics in the ignition module in such a way that an ignition pulse or ignition operation is initiated only in the case of forward rotation.

For the purpose of realizing the indicative point in the voltage signal, use is made, according to the invention, of a magnet pole arrangement, or pole shoe arrangement, and a coil arrangement which have such geometric relationships to one another that, upon each magnet wheel revolution, at least one discontinuity point, in particular, a break point or, also, a region or section with two or more extreme points (maxima, minima) occur in the curve characteristic of a voltage half-wave of determined polarity. The physical conditions and relationships for generating the indicative points such as discontinuity points, break points, extreme points or dips in the voltage signal of an ignition coil are known to the specialist in the art (cf. patent publications U.S. Pat. Nos. 3,722,488, 3,809,040, 4,074,669 and IT-A-1 235 393 and magnet wheel ignition module arrangements available on the market). Hitherto, however, these known relationships have not been generated or used specifically for the purpose of recognizing direction of rotation. Such a curve characteristic can then be "consulted" in respect of polarity and the extreme or discontinuity points with relatively simple electronics and/or software expenditure. Suitable for this purpose are electronic evaluation means, provided with a differentiating device, which can output the direction of rotation result in the form of a short pulse or also as a flag.

The invention offers the advantageous development that a voltage signal of a coil on the U- or E-shaped iron core of the ignition system can be used for the purpose of deriving the direction of rotation signal. Separate construction space, or other additional constructional measures for a separate iron core, are no longer necessary.

Since, according to the invention, the predefined polarity of the voltage pulse is ascertained by means of the discontinuity point, for example, an amplitude level dip, and the polarity reverses in known manner upon reversal of the direction of rotation, the concept of the invention makes provision whereby the direction of rotation signal is set and/or output (fixed in respect of angle) by the appropriately controlled output signal generator only upon forward rotation of the magnet wheel.

For the purpose of realizing a minimum and/or maximum rotational speed for the internal combustion engine, provision is made, according to an advantageous development of the invention, whereby the electronic evaluation means of the ignition module comprise one or more threshold-value decision elements which respond to a predetermined signal level or amplitude value of the current pulse or voltage pulse from the ignition coil arrangement. In dependence on this, the differentiating device and/or the output signal generator is/are put into operation, supplied with current and/or activated. In this case, use is made of the fact that the signal level or the amplitude of the current pulse or voltage pulse from the coil or coils is proportional to the rotational speed of the magnet wheel, or of the internal combustion engine.

In particular, the inventive concept consists in recognition of the direction of rotation from the voltage characteristic within a half-wave or a voltage pulse on the basis of the indicative point such as, for example, dip, minimum in the amplitude peak range or other discontinuity points. Ignition coil arrangements with a U-shaped iron core whose two limbs are directed towards the circumference of the magnet wheel are used in many cases. For each revolution, this generates a voltage pulse with three half-waves of alternating polarity. According to an advantageous development of the invention, in the case of an ignition coil arrangement with a U-shaped iron core, the middle half-wave is used to contain the information on the direction of rotation in the form of the indicative discontinuity point or extreme point, including a voltage dip. The preceding and succeeding voltage half-waves of opposite polarity can therefore be removed, in particular, filtered out, by the evaluation means, so that the middle half-wave can be evaluated independently of the preceding or the succeeding half-wave. This achieves the advantage that only a very small angular range, of the order of magnitude of one degree, need be evaluated for the purpose of recognition of the direction of rotation.

A further advantage of the general inventive concept consists in the fact that it can be realized by means of discrete circuit technology with a CR differentiating device and simply constructed transistor switching elements, the latter, in particular, for realization of the output signal generator. With this technology, the voltage half-wave with the indicative point (voltage dip, break point, etc.) can be advantageously utilized as a supply voltage for the active components, such as transistor switches, in the differentiating device. Since this half-wave with the information on the direction of rotation must always have a determined polarity (for correct direction of rotation), the output signal generator is consequently activated only if the direction of rotation is correct. In this way, a direction of rotation signal can be generated with high reliability and a small circuitry requirement.

However, the invention is not limited to realization by means of discrete circuit technology. The method according to the invention can also be implemented in a programmable microcontroller in the form of a software. The coil signals are then supplied to the microcontroller via appropriate analog/digital interfaces.

BRIEF DESCRIPTION OF THE SEVERAL VIEWS OF THE DRAWINGS

Further details, features, advantages and effects ensuing from the invention are disclosed by the claims and the following description of preferred embodiment examples of the invention, and by the drawings, wherein:

DETAILED DESCRIPTION OF THE INVENTION

Figure 1:
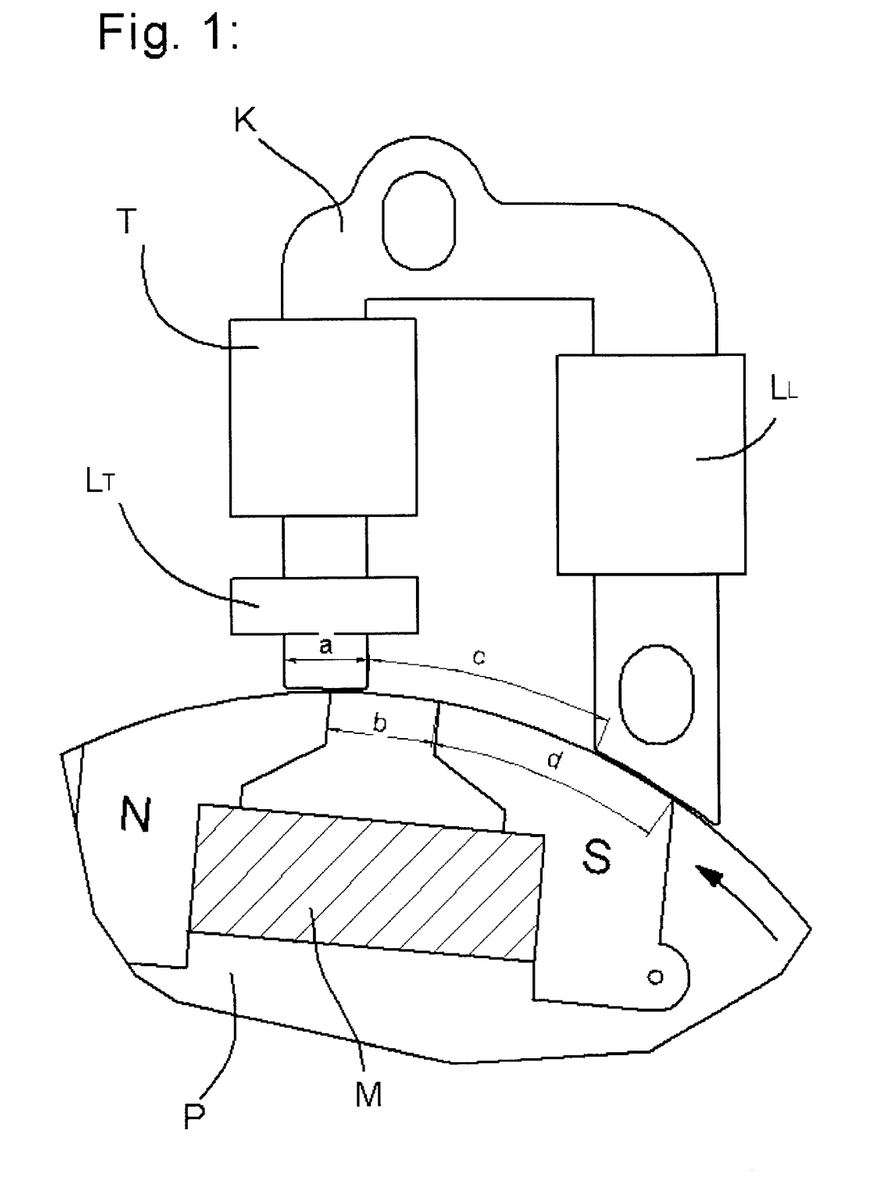
FIG. 1 shows, in schematic form, an ignition system with magnet wheel and ignition module according to the invention.
Figure 3A:
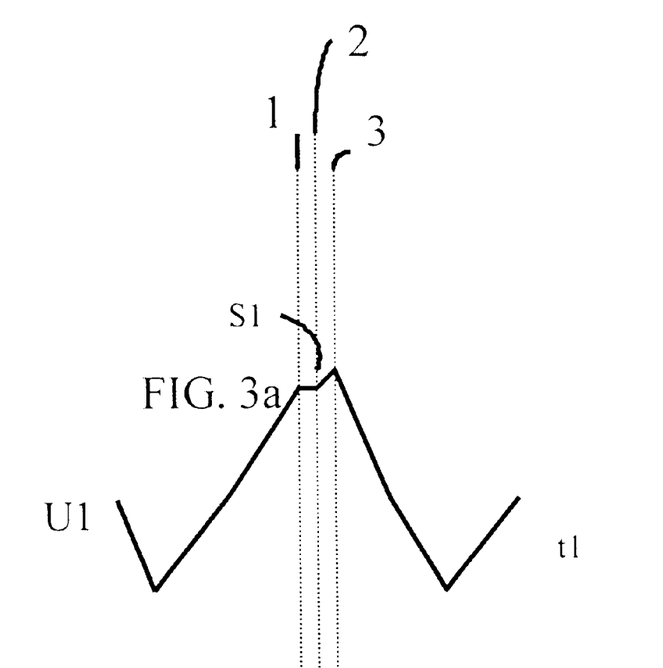
FIGS. 3a–3i, 3k shows voltage-time diagrams of induced voltage pulses or half-waves, and resulting pulses of different processing stages and directions of rotation.
Figure 3B:
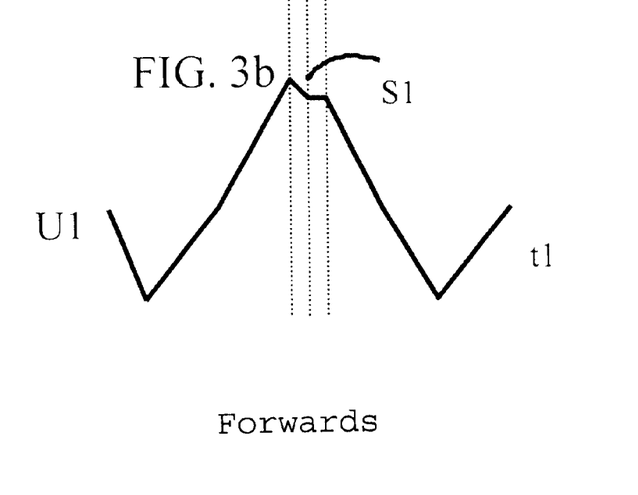
Figure 3C:
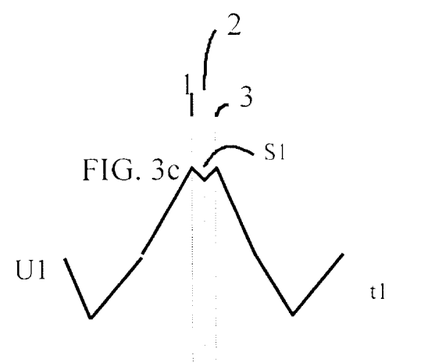
Figure 3D:
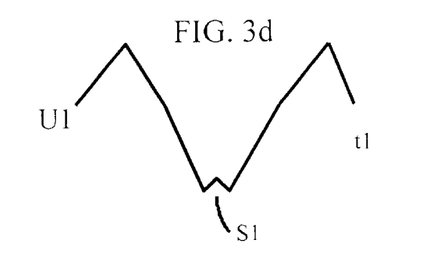

The ignition system according to the invention is based on a magnet generator which, as shown by FIG. 1, comprises a magnet wheel P, disposed in a torsionally rigid manner on the crankshaft of an internal combustion engine, not depicted, with a peripherally disposed magnet M. The direction of rotation is indicated by an arrow pointing anti-clockwise. A pole shoe N, S is respectively mounted on the north- and south-pole ends of the magnet M. With each revolution of the magnet wheel P, this magnet arrangement M, N, S is moved past an iron yoke core K with two limbs. The magnetic circuit can thus close once with each revolution, when the two limbs of the iron yoke core K each lie at least partially opposite one of the two pole shoes N, S. The limb which lies opposite the north pole N when the magnetic circuit is closed is encompassed by the ignition transformer T and by the trigger coil LT, whereas the other limb, lying opposite the south pole S, is surrounded by a charging coil LL. As the magnet wheel P rotates, an electrical voltage with a sequence of three voltage half-waves of alternating polarity (cf. FIGS. 3a, 3b, 3c) is induced at least in the charging coil LL and the trigger coil LT. Upon reversal of the direction of rotation, the polarity of each of these half-waves changes as shown in FIG. 3d.

In order to create a curve characteristic with an indicative point, at least in the middle half-wave of the induced voltage pulse, the (cross-sectional) core limb width a is dimensioned, as shown by FIG. 1, to be smaller than the spacing b separating the pole shoes in the circumferential direction of the magnet wheel P. Preferably, the limb of the iron yoke core K on which the trigger coil LT is disposed, and which forms the alternating voltage source for a subsequent electronic evaluation for the purpose of determining the direction of rotation, is fashioned with the said limb width a. Dimensioning examples which have proved successful in practice are a core limb width a=6 mm and a pole shoe spacing b=9 mm. Moreover, specific dimensionings of the core limb spacing c and of the pole shoe length d, shown in FIG. 1, can also be included for the purpose of producing the indicative discontinuity points S1 as shown in FIGS. 3a–3c. Depending on the dimensioning of the iron yoke core K, the dimensions a, c, b, d of the yoke core limb K and of the magnet arrangement M, N, S, specific signal characteristics can be achieved, as depicted in FIGS. 3a–3c.

Figure 2:
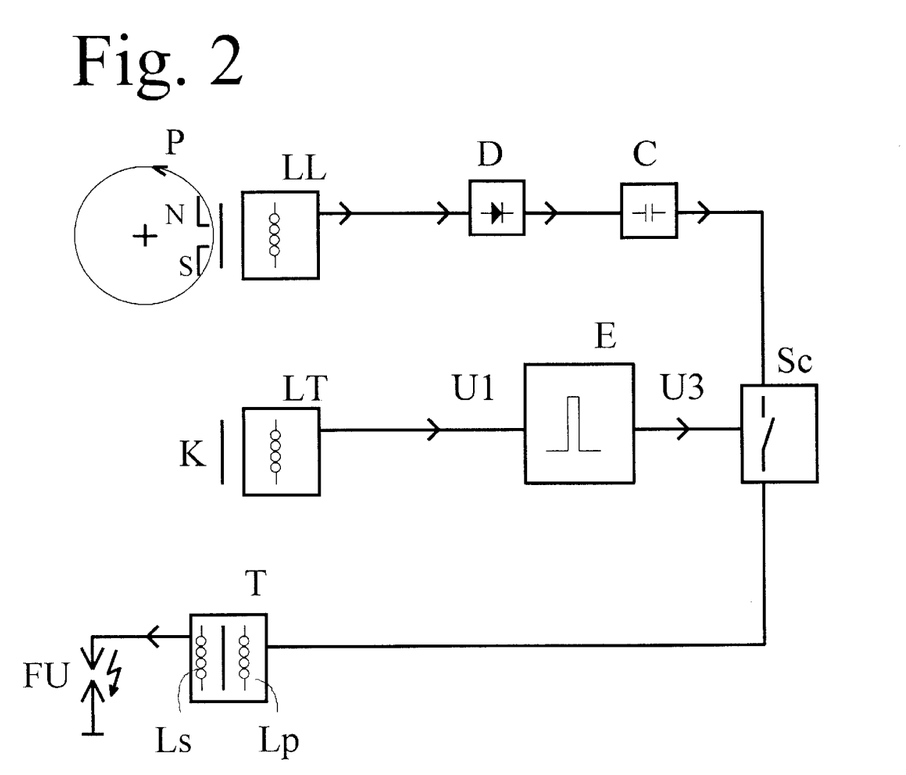
FIG. 2 shows, by means of a block diagram, the basic principle of a capacitor ignition module, on which the invention is based.

As shown by FIG. 2, the magnet M with the pole shoes N, S is rotated past the U-shaped iron yoke core K of the ignition module by the magnet wheel P which rotates, in angular synchroneity, with the crankshaft of an internal combustion engine. This causes the iron yoke core K to be magnetized by an alternating magnetic field. This is because an electrical voltage, which charges an energy store, for example, a storage inductor or an ignition capacitor C, via a rectifier D, is induced in the charging coil LL disposed on the iron yoke core K. If the indicative discontinuity points S1 occur in the middle half-wave in a predefined polarity, for example, in the form of a transient voltage dip in the voltage signal of the trigger coil LT, evaluation electronics E, using the incoming coil signal U1, recognize this in the case of forward rotation on the basis of the polarity defined for it, and a corresponding output pulse U3 is generated at the output of the evaluation electronics E. This latter pulse serves as a direction of rotation signal and, as shown by FIG. 2, controls a switch Sc. The output pulse, or the direction of rotation signal U3, is generated regularly with each magnet wheel revolution, always at the same angular position of the magnet wheel, corresponding to the inconstant signal dip S1. This causes the energy store C to be discharged via the primary coil Lp of the ignition transformer T, as a result of which a high-voltage pulse is generated in the secondary coil Ls. This pulse initiates an ignition spark at a spark gap FU of a spark plug in the combustion chamber of the internal combustion engine.

The use of the recognition of direction of rotation according to the invention is not limited only to a simple ignition module as schematically represented in FIG. 2. Rather, the evaluation circuit E according to the invention, which is to be explained in greater detail below, can also be used for ignition modules with additional electronics, for example, electronics for altering the ignition point, the output pulse U3 of the evaluation circuit E being used as a function argument for enabling or blocking of an ignition spark in dependence on the direction of rotation. In the example represented in FIG. 2, the voltage signal U1 of the trigger coil LT is supplied to the evaluation electronics. In the case of other, possible examples of the invention, the signal of another coil, for example, that of the primary coil Lp of the ignition transformer T or that of the charging coil LL, can also be used if it includes information on the direction of rotation in the form of the indicative, for example, dip-type discontinuity or break points S1. As already indicated, the principle of the invention represented in the drawing can be used not only in capacitor ignition systems, but also in inductive, magnetic ignition systems.

As shown by FIGS. 3a–3d, the magnet wheel P rotating past the iron yoke core K generates in the trigger coil LT a voltage pulse with three succeeding half-waves of alternating polarity. In the case of forward rotation in the anticlockwise direction as indicated by arrows in FIGS. 1 and 2, the middle voltage half-wave has positive polarity, whereas the first and the third, or last, half-wave each have negative polarity. In exact reversal, in the case of (incorrect) backward direction of rotation, the second, or middle, half-wave is negative, whereas the first and third half-waves are positive.

In all of the signal characteristics represented in FIGS. 3a–d, the middle half-wave in each case has an indicative dip S1, in its upper amplitude peak range, which in each case is formed from three discontinuity break points 1, 2 and 3. These have their origin in the geometric relationships with the pole shoe spacing b and the core limb width a and, if applicable, the core limb spacing c and the pole shoe length d, considered above. According to FIG. 3a, from a particular voltage level corresponding to the upper amplitude peak range, the initially constant rise of the middle voltage half-wave leads to a first break point 1 from which the voltage curve extends in a first maximum, without further gradient, to a second break point 2. From there, there is a further abrupt gradient to a third break point 3, from which the voltage characteristic drops continuously, passing into the third or last half-wave with a negative polarity. According to FIG. 3b, the first break point 1 constitutes the highest voltage value of the middle voltage half-wave. From there, the voltage curve runs with a descending gradient to the second break point 2, from which it proceeds without a gradient (maximum or extreme point) to the third, or last, break point 3. From the latter, the curve characteristic passes, with a continuously falling slope, into the third, or negative, half-wave. According to FIG. 3c, the dip S1 does not have any section of curve at which the derivation would be zero. Instead, following attainment of a first maximal value in the first break point 1, the voltage curve runs in a zigzag line, with first a drop to the second break point 2 and a rise to the third break point 3, from which there is a continuous, descending transition to the last half-wave of negative polarity. In the case of (incorrect) backward running, the curve characteristic according to FIG. 3d, the exact complement of FIG. 3c, is obtained.

Figure 3E:
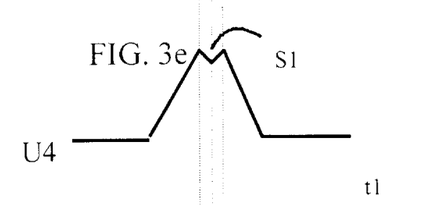
Figure 3F:
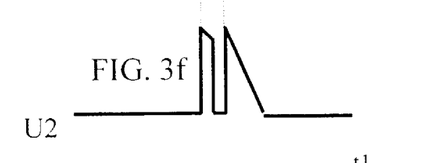
Figure 3G:
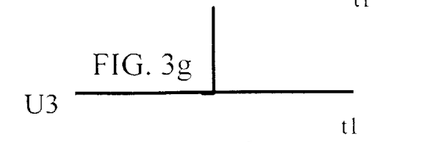
Figure 3H:
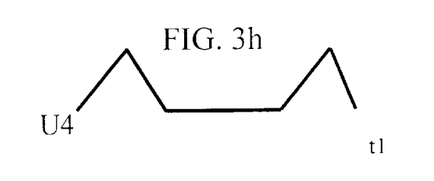
Figure 3I:
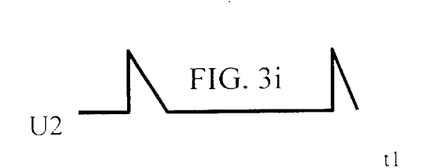
Figure 3K:
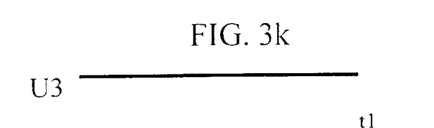
Figure 4:
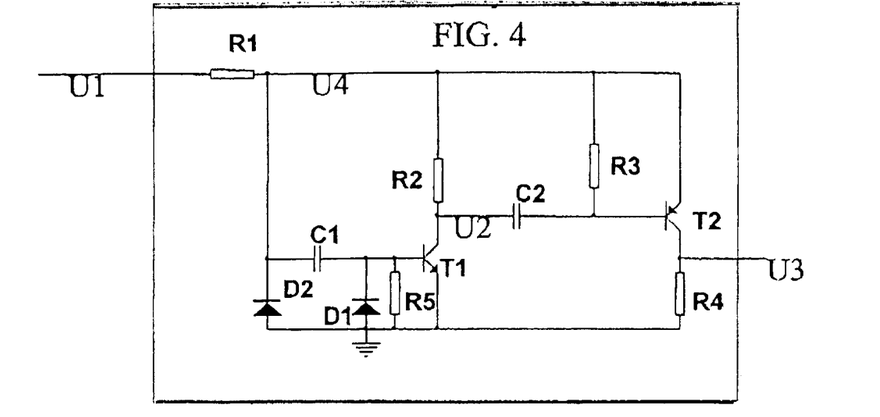
FIGS. 4–6 show direction of rotation detectors according to the invention, realized with different circuits.
Figure 5:
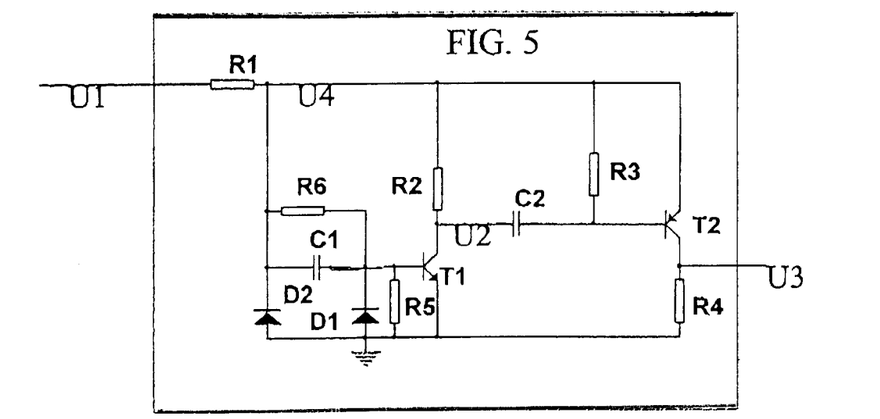

The basic circuits for recognition of direction of rotation according to the invention which are shown in FIGS. 4 and 5 are suitable for evaluating the respective positive half-waves of the coil signal U1 according to FIGS. 3a and 3c. In the case of correct forward rotation, at the instant of the dip S1 according to FIG. 3g, they generate the direction of rotation signal U3 in the form of a short, positive pulse. As shown by FIG. 3k, no output pulse is generated in the case of (incorrect) backward rotation. As shown by FIGS. 4 and 5, the coil voltage signal is supplied to the direction of rotation detector across a resistance R1. A diode D2, connected directly at the output of the resistance R1, short-circuits negative half-waves so that, as shown by FIGS. 3e and 3h, only positive half-waves are supplied to an RC high-pass C1, R5 as a first differentiating element. The output of this first differentiating element is formed with a switching transistor T1 with the collector resistance R2, which does not supply the filtered-out positive half-waves U4 to the switching transistor T4 as a voltage supply. The same applies to the second switching transistor T2 which, with its collector resistance R4, is coupled in reverse polarity to the input resistance R1 via the blocking diode D2 for the purpose of voltage supply. The circuit for recognition of direction of rotation thus operates only in the case of a middle, positive half-wave, and only during this period can an output pulse U3 according to FIG. 3g, signalling a forward direction of rotation, be generated.

In the case of the circuit variant according to FIG. 4, during a signal rise in the middle half-wave according to FIGS. 3a, and 3c, a current flows through the first differentiating element C1, R5, a voltage dropping at the resistance R5 connected between the base input of the switching transistor T1 and earth. The RC high-pass of the first differentiating element is rated so that, during the signal rise, the first switching transistor T1 is controlled or switched by it into the conductive state. There is thus produced at its collector output the intermediate voltage U2 represented in FIGS. 3f and 3i which, due to the control by the first differentiating element C1, R5, is close to zero volts. During the signal rise of the diode filter signal U4, a current additionally flows through a further RC high-pass C2, R3 as a second differentiating element. Its input capacitor C2 is directly connected to the output, or collector, of the first switching transistor T1. The other terminal is connected directly to the base input of the second switching transistor T2, which operates as an output signal generator, as it were, for the direction of rotation signal U3. The resistance R3 of the second differentiating element is connected between the transistor base of the second switching transistor T2 and the input resistance R1. The collector resistance R4 of the second switching transistor T2 is directly connected to earth, or connected to the anode of the blocking diode D2. The components of the RC high-pass of the second differentiating element C2, R3 are rated so that only a small voltage, which remains below the switch-on threshold of the second switching transistor T2, occurs at the resistance R3 connected to the base input of the second switching transistor T2. In order that the second differentiating element C2, R3 switches on only in the case of steeper slopes, corresponding to those of the output signal U2, at the instant of the second break point 2 of the first switching transistor T1 (cf. FIG. 3f), the input capacitor C2 of the second differentiating element is rated with approximately one hundredth to one tenth of the capacitance of the input capacitor C1 of the first differentiating element C1, R5.

If the signal rise ends at the first break point 1, as shown by FIG. 3a or 3c, the switching transistor T1 is controlled into the blocking state and switches off. As a result, the intermediate voltage U2 at the collector output rises abruptly to the voltage U4 of the diode filter signal. The input capacitor C2 of the second differentiating element C2, R3 discharges both across the collector resistance R2 and across the base resistance R3. The switching off of the blocking transistor T1 or its control into the blocking state is represented in FIG. 3f by the intermediate voltage at the instant of the first break point 1.

In the rest of the characteristic, following attainment of the second break point 2, the diode filter voltage U4 then begins to rise again, so that the first switching transistor T1 switches on again. The intermediate voltage U2 at the collector output therefore drops back abruptly to close to zero volts (cf. instant of the break point 2 in FIG. 3f). This abrupt negative voltage change is sufficiently steep to activate the second differentiating element C2, R3, which is less sensitively rated, with a short, pulse-type current flow which causes a voltage pulse at the base resistance R3 of the second switching transistor T2, as a result of which the second switching transistor T2 briefly switches through. This causes a drop, at its collector resistance R4, of a needle-type, positive voltage pulse which can be further processed as a direction of rotation signal U3 (cf. FIG. 3g and FIG. 2). A protective diode D1 is connected in parallel to the base resistance R5 of the first switching transistor T1, serving to protect the switching transistor T1 from negative control voltages at the input.

Since the supply voltage for the circuit of the direction of rotation detector according to FIG. 4 is formed by the diode filter voltage U4 corresponding to the positive half-wave of the coil signal U1, the condition is necessarily always fulfilled whereby an output pulse U3, according to FIG. 3g, for the (correct) direction of rotation can be generated only in the case of a positive polarity of the coil signal U1. In addition, it is ensured that the direction of rotation signal U3 is generated only if the diode filter signal U4, corresponding to the coil signal U1, has attained at least a predetermined voltage threshold or amplitude level, which can be selectively realized through the specifically rated input circuitry with the RC high-pass as a first differentiating element C2, R5. Furthermore, the rating of the control or input circuitry of the second switching transistor T2, as an output signal generator, enables its input sensitivity to be rated so that it always starts to operate only from a higher voltage level of the diode filter signal U4 than the first switching transistor T1.

The circuit according to FIG. 4 can process signal or curve forms according to both FIGS. 3a and 3c. This is because, due to the first differentiating element C1, R5 alone at the input of the switching transistor T1, the latter switches off, or is always controlled into the blocking state, if either there is no signal rise in the case of the diode filter voltage U4 or if there is a signal drop (cf. time interval between the first and second break points 1, 2 in FIG. 3a and FIG. 3c).

According to FIG. 3d, the coil signal U1 tapped by the trigger coil LT would be inverted in the case of backward rotation (to be prevented). According to FIG. 3i, upon a signal rise of the voltage filtered by the diode D2, the first switching transistor T1 would again rise until an amplitude peak range is reached. With a subsequent fall of the diode filter signal U4, the first switching transistor T1 would switch off, not abruptly with a sufficiently steep slope, but only gradually (cf. FIG. 3i). This less steep fall of the intermediate voltage U2 according to FIG. 3i is not sufficient to switch through the transistor T2 across its preceding, second differentiating element R2, C3 and, as shown by FIG. 3k, no pulse would be generated for any backward rotation.

According to FIG. 5, the circuit of the direction of rotation detector is expanded by a parallel resistance R6 which is shunted out, in parallel connection in relation to the input capacitor C1 of the first differentiating element C1, R5, by the input capacitor according to frequency position. The parallel resistance R6 makes provision whereby, upon correct forward rotation, a voltage pulse U3 according to FIG. 3g can be generated even in the case of a signal or curve characteristic of a positive half-wave according to FIG. 3b. The switching transistor T1 can be controlled into the conducting state upon positive voltage polarity of the diode filter signal U4, even if there is not a rising signal or curve characteristic, as shown in the interval between the second and the third break points 2, 3 according to FIG. 3b. The first switching transistor T1 is switched off via the first differentiating element C1, R5 only in the case of a signal drop between the first and the second break points 1, 2 in FIG. 3b, as a result of which, as shown by FIG. 3f, the intermediate voltage U2 rises, analogously to FIG. 4, in the corresponding time interval. If an extreme point with the derivation zero (neither rise nor fall) occurs from the second break point 2 according to FIG. 3b, the first switching transistor T1 is again controlled into the conducting state, via the parallel resistance R6, as a result of which the abrupt voltage drop occurs in the interval between the second and the third break points 2, 3, shown by FIG. 3f. This controls the second differentiating stage C2, R3, with the second switching transistor T2 as output signal generator, to form the direction of rotation signal U3 according to FIG. 3g.

Figure 6:
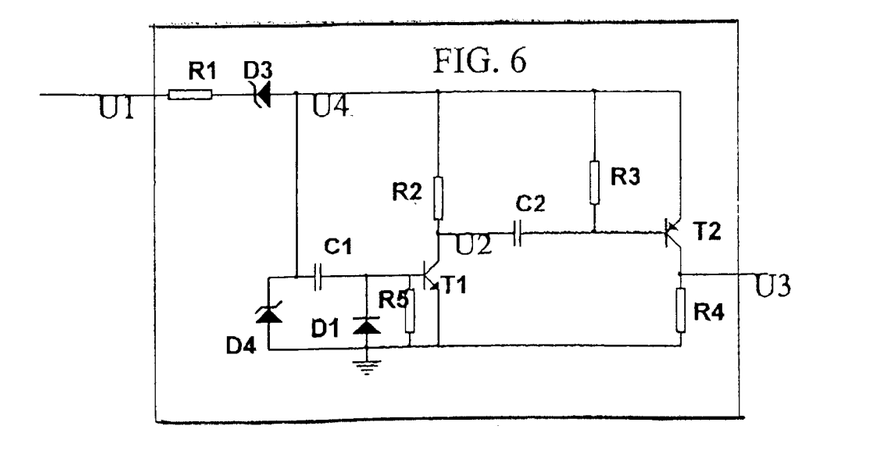

As shown by FIG. 6, the two-stage differentiating circuit is expanded by a Zener diode D3 which, as a threshold value switch, is connected directly after the input resistance R1, its anode being directly connected to the input side of the input capacitor C1. Due to this Zener diode, the amplitude of the coil voltage U1, which rises as the rotational speed of the magnet wheel increases, can only form a diode filter signal U4, in particular, for voltage supply to the differentiating device or the direction of rotation detector circuit, following exceeding of the threshold voltage of the Zener diode D3. Moreover, a further Zener diode D4, in the same arrangement as the above blocking diode D2, is used for the polarity blocking function instead of the blocking diode D2 according to FIGS. 4 and 5. The direction of rotation detector circuit thus begins to operate only from a minimum rotational speed which can be predefined through the threshold voltage of the Zener diode D3. Below this minimum rotational speed, direction of rotation output signals U3 according to FIG. 3g are not generated. The replacement of the above blocking diode D2 by the blocking Zener diode D4 also permits ascertainment of a maximum rotational speed up to which direction of rotation output pulses according to FIG. 3g can be output. The blocking Zener diode D4 discharges to earth voltages of the filter signal U4 which are above its threshold voltage. Since the dip S1, with its break points 1, 2, 3 according to FIGS. 3a–3e, lies close to the amplitude peak range of the filter signal U4, this dip S1 is cropped if the limiting rotational speed, or threshold voltage of the blocking Zener diode, is exceeded. Consequently, there is no further recognition of the dip S1 if the limiting rotational speed is exceeded, and output pulses U3 according to FIG. 3g for a "correct" direction of rotation are no longer output.

The function of the direction of rotation detectors according to FIGS. 4–6 can also be implemented through programming, or algorithm, in a microcontroller according to the following specification:

Forward rotation is recognized if
the start of a signal rise is ascertained
in the signal characteristic of a half-wave of determined polarity (in the example, +)
above a voltage threshold of this polarity (>0 for +polarity, <0 for –polarity)
This function is also given with the circuit according to FIG. 4. The rotational speed is ascertained thus in the case of voltage characteristics according to FIGS. 3a and 3c.

The following method is suitable for a voltage characteristic according to FIG. 3b. Forward rotation is recognized if
the end of a signal drop is ascertained
in the signal characteristic of a half-wave of determined polarity (in the example, +)
above a voltage threshold of this polarity (>for +polarity, <0 for –polarity).

This function is also given with the circuit according to FIG. 5. The rotational speed is ascertained thus in the case of voltage characteristics according to FIGS. 3c and 3b.

In summary:
Forward rotation is recognized if
the start of a signal rise or the end of a signal drop is ascertained
in the signal characteristic of a half-wave of determined polarity (in the example, +)
above a voltage threshold of this polarity (>0 for +polarity, <0 for –polarity)

The condition "start of a voltage rise" can be replaced by a substantial increase in the voltage rise, and the condition "end of a voltage drop" can be replaced by a substantial reduction of the voltage drop.

The start of a voltage rise, or the substantial increase in the voltage rise, on the one hand, or the end of a voltage drop, or the substantial reduction of the voltage drop, on the other hand, can be detected through the setting of the response threshold of the circuitry or of an analog/digital interface of a microcontroller and varied, according to individual requirements, through the rating of the transistor and RC high-pass circuits of FIGS. 4–6 or through programmed setting of the response thresholds.

The evaluation must be performed above a determined voltage value, or voltage threshold, in order to ensure that the start of a voltage rise, or of a half-wave, which occurs following a polarity change from zero volts onwards, or at the start of the positive half-wave, can be differentiated from the start of a voltage rise in the range of the dip S1 close to the maximum peak voltages of the half-wave.

List of References

P Magnet wheel
M Magnet
N, S Pole, pole shoe
K Iron yoke core
T Ignition transformer
LT Trigger coil
LL Charging coil
a Core limb width
b Pole shoe spacing
c Core limb spacing
d Pole shoe length
S1 Dip, indicative discontinuity range
D Rectifier
C Ignition capacitor
E Evaluation electronics
U1 Coil signal
U3 Output pulses, direction of rotation signal
Lp Primary coil
Ls Secondary coil
Sc Switch
FU Spark gap
1, 2, 3 Discontinuity break points
R1 Input resistance
D2 Blocking diode
C1, R5 First differentiating element
T1, T2 Switching transistors
R2, R4 Collector resistance
U2 Intermediate voltage U4 Diode filter signal
C2, R3 Second differentiating element
C1, C2 Input capacitors
R3 Base resistance
D1 Protective diode
R6 Parallel resistance
D3 Zener threshold-value diode
D4 Zener blocking diode

What is claimed is:

1. A method for recognition of direction of rotation for the ignition system of an internal combustion engine, using a magnet wheel which can be moved past an electrical ignition coil arrangement by the internal combustion engine, as a result of which there is induced in the coil arrangement for each revolution at least one current pulse or voltage pulse whose polarity is dependent on the direction of rotation, wherein there are used a design and arrangement of the magnet poles of the magnet wheel and of the coil arrangement with such geometric relationships to one another that, upon each magnet wheel revolution, the curve form of a current pulse or voltage pulse has at least two pre-specified extreme points with a curve characteristic which is substantially neither rising nor falling and/or at least one break point or point with an otherwise discontinuously varying curve characteristic, and a direction of rotation signal is set and/or output in dependence on the recognition of a predetermined polarity for the current pulse or voltage pulse and the one or more said points in its curve characteristic.

2. A method according to claim 1, wherein this direction of rotation signal is set and/or output in dependence on the recognition of an attained predetermined amplitude value of the current pulse or voltage pulse.

3. A method according to claim 2, wherein, with or following attainment of the amplitude value, a first differentiation is used to sample and evaluate the pulse curve form and a second differentiation is used to form the rotation of direction signal from the output values of the first differentiation.

4. A method according to either of claim 3, wherein the differentiating or evaluation means are operated in dependence on the recognition of a predetermined minimum and/or maximum rotational speed of the magnet wheel.

5. A method according to claim 1, wherein the method includes the use of one or more electronic filters or other evaluation means for recognizing the aforementioned curve points or the amplitude value of the pulse which is used, in dependence on its predetermined polarity, for supplying current to the evaluation means.

6. A method according to claim 1, wherein the direction of rotation signal is used as an argument for a control function of the ignition system.

7. An ignition module with evaluation means for recognition of direction of rotation according to the method with an ignition coil arrangement through which passes an iron core for the purpose of magnetization by an external magnet wheel, the evaluation means sampling, evaluating and processing, for the purpose of recognition of direction of rotation, current pulses or voltage pulses from the ignition coil arrangement induced by interaction with the rotating magnet wheel, wherein the coil arrangement and/or its iron core is designed and disposed with such geometric relationships in respect of the spacing of the magnet poles of the magnet wheel that, upon each magnet wheel revolution, the curve form of a current pulse or voltage pulse has at least two pre-specified extreme points with a curve characteristic which is substantially neither rising nor falling and/or at least one break point or point with an otherwise discontinuously varying curve characteristic, and the evaluation means comprise a differentiating device which responds to the said curve points and an output signal generator which is controlled in dependence on the differentiation result.

8. An ignition module according to claim 7, wherein the iron core has a width or a diameter which are each smaller than the spacing of the magnet poles in the circumferential direction on the assigned magnet wheel.

9. An ignition module according to either of claim 7 or 8, wherein the differentiating device comprises a first and a second, functionally subsequent differentiating element which controls the output signal generator.

10. An ignition module according to claim 9, wherein the first and/or the second differentiating element is provided with a switching element at the respective output.

11. An ignition module according to claim 9 one of, wherein the output signal generator is realized with a switching element at the output of the differentiating device.

12. An ignition module according to claim 9, wherein the output signal generator controls an energy store discharge switch for the purpose of initiating the ignition process.

13. An ignition module according to claim 9, wherein the evaluation means comprise a detector or filter, responding to a predetermined polarity of the current pulse or voltage pulse, in dependence on which the differentiating device and/or the output signal generator can be operated and/or supplied with current.

14. An ignition module according to claim 9, wherein the evaluation means comprise one or more threshold-value decision elements, responding to a predetermined signal level or amplitude value of the current pulse or voltage pulse, in dependence on which the differentiating device and/or the output signal generator can be operated, supplied with current and/or controlled.

15. An ignition module according to claim 14, wherein a first and a second threshold-value decision element are respectively assigned to the first and second differentiating elements, or respectively associated switching element, the threshold of the first threshold-value decision element being set lower than that of the second.

16. An ignition module according to claim 15, wherein the iron core of the coil arrangement is fashioned with a U-type or E-type profile.

17. An ignition module according to claim 15, wherein the evaluation means, or at least the differentiating device, are/is realised with a programmable microcomputer or other sequentially operating processor.

18. A direction of rotation detector for a method or an ignition module which can be coupled on the input side to an alternating voltage source, in particular, to an ignition coil arrangement excited by a magnetic alternating field, for the purpose of sampling and evaluating or filtering current half-waves or voltage half-waves generated therein, wherein the detector includes a first and a second, functionally subsequent to the first, differentiating element which controls an output signal generator indicating the direction of rotation, a polarity blocking filter, responding to a predetermined polarity of voltage half-waves, preceding the first and/or second differentiating element on the input side.

19. A direction of rotation detector according to claim 18, wherein the detector includes a first switching element between the first and second differentiating element.

20. A direction of rotation detector according to either of claim 18 or 19, wherein the output signal generator is realized with a possibly second switching element at the output of the differentiating device.

21. A direction of rotation detector according to claim 20, wherein the second switching element or the second transistor switch are designed or connected for operation with a higher supply voltage than the first switching element or the first transistor switch.

22. A direction of rotation detector according to claim 19, wherein the first and/or second switching element are fashioned as transistor switches whose respective input circuitries are formed with the differentiating elements.

23. A direction of rotation detector according to claim 19, wherein the first differentiating element has a higher input sensitivity than the second.

24. A direction of rotation detector according to claim 19, wherein the first and/or the second differentiating element is essentially realized as high-passes with an input capacitor and a subsequent resistance.

25. A direction of rotation detector according to claim 24, wherein the capacitance value of the input capacitor of the first differentiating element is approximately ten to one hundred times the capacitance value of the input capacitor of the second differentiating element.

26. A direction of rotation detector according to claim 24, wherein the detector includes a current path connected in parallel to the input capacitor of the first differentiating element.

27. A direction of rotation detector according to claim 26, wherein, for the purpose of being supplied with current or voltage, the differentiating elements, switching elements and/or transistor switches are connected to the polarity blocking filter and, through it, can be coupled to the alternating voltage source.

* * * * *